Aug. 22, 1939.   E. F. NELSON   2,170,275
CONVERSION OF HYDROCARBONS
Filed May 31, 1938
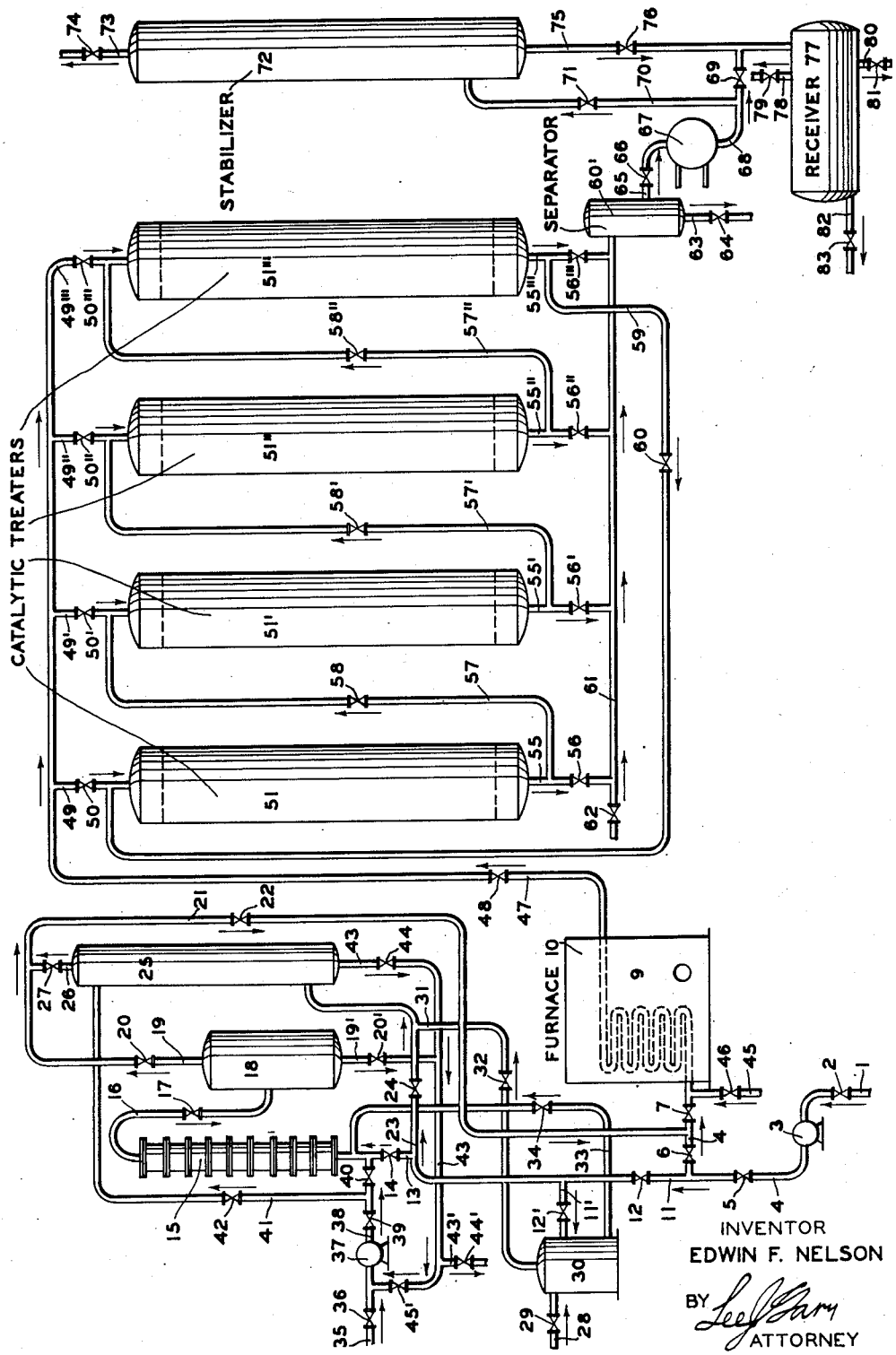
INVENTOR
EDWIN F. NELSON
BY *Lee J. Gary*
ATTORNEY Patented Aug. 22, 1939

2,170,275

UNITED STATES PATENT OFFICE 2,170,275

CONVERSION OF HYDROCARBONS

Edwin F. Nelson, Chicago, Ill., assignor to Universal Oil Products Company, Chicago, Ill., a corporation of Delaware Application May 31, 1938, Serial No. 210,899

14 Claims. (Cl. 196—10)

This invention relates more particularly to the conversion of the normally gaseous olefins present in cracked hydrocarbon gas mixtures into liquids of high antiknock value utilizable directly as motor fuel or as blending agents in gasolines inferior in this respect.

It is more specifically concerned with a type of operation characterized by the use of a particular type of granular polymerizing catalyst and a sequence of closely cooperating steps leading to the formation of the desired liquid gasoline boiling range polymers with the least difficulty in regard to control of operating conditions and particularly catalyst life.

The reactions of polymerization among olefinic hydrocarbons are uniformly exothermic in character. Consequently in large scale operations definite provision must be made for abstracting the heat of reaction to maintain a uniform temperature condition since the rate and nature of the polymerization reactions is peculiarly sensitive to variations in temperature.

Cracked gas mixtures contain in addition to hydrogen and the lower boiling paraffins varying percentages of ethylene, propylene, and the butylenes, the amount of ethylene usually equaling or exceeding the total percentages of propylene and the butylenes. The controlled polymerization of ethylene to form relatively low molecular weight polymers boiling within the range of gasoline is difficult and in addition is principally focused in refining operations toward the conversion of propylene and the butylenes since these are more or less readily polymerized by catalysts to dimers and trimers which are directly utilizable in gasoline. Thus, it is not general practice to polymerize the olefine present in the so-called stabilizer overhead and in the total mixture of compounds present in the high pressure receivers of cracking plants.

Conversion of propylene and butylenes into gasoline boiling range polymers is practiced commercially both by thermal and thermal-catalytic methods although the latter are more selective in producing only mono-olefinic polymers without the concurrent production of cyclic hydrocarbons due to side reactions of a secondary character. Various types of catalysts have been proposed to accelerate the polymerization reactions and among these may be mentioned those consisting of relatively inert carrier granules supporting mineral acids or salts, a particular member of this class being those supporting phosphoric acids which have a mild and controllable polymerizing action so that maximum yields of gasoline boiling range liquids are produced. It is with improvements in catalytic polymerizing process employing this last named type of catalyst that the present invention is concerned.

In one specific embodiment the present invention comprises a process for controllably polymerizing propylene and butylenes present in hydrocarbon gas mixtures by contact with solid phosphoric acid-containing catalysts, the operation being conducted in a series of stages characterized by increasing temperatures, and decreasing catalyst activity.

The foregoing brief statement of the present invention will be amplified by describing a characteristic operation in connection with the attached drawing which shows diagrammatically in general side elevation by the use of conventional figures an arrangement of apparatus in which the process may be conducted. The details and features of the process will be developed in the description of the process flow.

In general the apparatus shown in the drawing consists of (1) a preliminary purification unit for the entering olefin-containing gas mixture; (2) a heater for bringing the gas mixture to the optimum temperature for primary contacting with the phosphoric acid-containing catalyst; (3) a series of treaters containing the catalyst; and (4) a fractionating system for stabilizing and recovering the polymer product.

The various cooperative features of the present process can be brought out by the description of an operation and for this purpose the attached drawing is provided which indicates diagrammatically in side elevation by the use of conventional figures the principal and essential details of a plant in which the process may be conducted.

Referring to the drawing in the case of charging stocks which are completely either in gaseous or liquid phase, they may be introduced through a line 1 containing valve 2 to a charging pump 3 which in the case of gaseous mixtures will be a compressor and in the case of liquid mixtures such as a stabilizer overhead will be an ordinary reciprocating or centrifugal pump. Pump 3 discharges into line 4 containing valves 5, 6, and 7 to permit proper operation as will be presently shown. In the case of charging stocks which are in mixed phase these may be admitted under suitable pressure to a separator 30 by way of a line 28 containing valve 29 so that the gaseous and liquid phases may be separated and separately treated.

In the case of charging stocks which are completely either in gaseous or liquid phase and which are low in contaminating substances such as basic nitrogen-compounds, hydrogen sulfide, etc., so that no preliminary treatment is required, the stocks may be passed directly to a heating element 9 disposed to receive heat from a furnace 10 to bring the olefin-containing mixtures up to temperatures suitable for the polymerization of the olefins by catalytic contact. In the case of relatively high sulfur mixtures containing, for example, 500 grains of sulfur per 100 cu. ft. (principally as hydrogen sulfide and low boiling mercaptans) a preliminary treatment with basic aqueous solutions may be resorted to in order to remove sulfur compounds and thereby prevent sulfur fixation in the polymerizing step. Thus in the case of relatively high sulfur liquid charging stocks they may be passed through a branch line 11 containing valve 12 with valve 6, 12' and 24 closed and through line 13 containing valve 14 into a mixing arrangement 15 which receives basic solutions by way of line 35 containing valve 36, pump 37 and line 38 containing valves 39 and 40. Line 13 may also receive liquid phase mixtures from separator 30 by way of line 33 containing valve 34. A line 11' containing valve 12' permits the discharge of mixed phase material from line 11 into separator 30 so that this separator may be interposed to provide gaseous and liquid phases for separate treatment if desired.

During passage through the mixer which may comprise a column containing inert filling material such as silica fragments or which may contain a succession of perforated plates, intimate contact of the charge with the basic solution is brought about and the total products are discharged through line 16 containing valve 17 into a separator 18 wherein the treated charge and the spent or partly spent solutions are separated by gravity. The hydrocarbon liquid may then be passed through line 19 containing valve 20 and line 21 containing valve 22 back to line 4 leading to the preheater 9 already mentioned. Partly spent alkali solution may be withdrawn from separator 18 through line 19' containing valve 20' and returned by way of line 43 to the inlet side of the solution feed pump until its strength is spent. Waste line 43' containing valve 44' may be used for the disposal of spent caustic which has no further capacity for treating. This line can be operated with valve 45' closed.

In the case of gaseous charges, these may enter the bottom of a treating tower 25 by way of line 23 containing valve 24 and pass upwardly countercurrent to descending streams of basic aqueous solutions, tower 25 being filled with inert fragments or containing regularly spaced trays or pans to insure effective contact between gas and liquid. The vapor or gaseous phase from separator 30 may also be admitted to line 23 by way of line 31 containing control valve 32. The treated gaseous mixture leaves the top of tower 25 by way of line 26 containing valve 27 to enter line 21 and pass back to line 4 as already described in the case of liquid charges. Basic solutions are admitted to the top of tower 25 by way of line 41 containing valve 42 and spent or partly spent solution may be returned for further use or disposed of by way of line 43 containing valve 44 on the bottom of the tower.

The foregoing description of the flow when employing basic solutions may be varied so that ordinary water or slightly acidulated water may be used instead of the caustic when the composition of the entering gas mixture shows that better results will be obtained with these wash liquids. This will occur when there are definite and detectable amounts of basic compounds such as the ammonia and the amines mentioned which have been found to form salts with the active phosphoric acid on the catalyst granules and rapidly and permanently impair its polymerizing activity. The choice of ordinary water, alkalized water, or acidulated water will be determined in any case by the composition of the entering gases.

The charge either with or without preliminary treatment preferably receives a controlled amount of water introduced through line 45 containing valve 46 before it is heated to a temperature suitable for contact with the polymerizing catalyst. The reason for this addition will become more apparent as the properties and action of the catalyst are described in due sequence but in general it may be stated at this point that experience has shown the necessity for maintaining approximately 2–5% of water vapor in gaseous or vapor mixtures undergoing polymerization by solid phosphoric acid catalysts in order to maintain the composition of the active catalytic material which is otherwise subject to a gradual dehydration under the usual range of operating conditions so that its catalytic effectiveness would be lost much more rapidly than when its deterioration is due only to gradual deposition of carbonaceous materials.

The catalyst which is preferably employed in the present process has already been mentioned as a "solid phosphoric acid" catalyst. A catalyst of this character may be prepared by the general operations of mixing a phosphoric acid with a relatively inert adsorbent material preferably of a siliceous character, such as kieselguhr, until a paste consisting of a major proportion by weight of the acid is produced, heating the pasty mixture to temperatures within the approximate range of 550–750° F. to produce a solid cake, grinding and sizing the cake with precautions for avoiding moist air contacts to produce particles of approximately uniform mesh and hydrating the particles by contact with superheated steam at temperatures of approximately 510° F. and atmospheric pressure to produce a degree of hydration of the phosphoric acid corresponding to maximum catalytic activity. This procedure may be alternated by employing extrusion or forming methods on the original pasty mixtures to produce small particles of regular size and shape prior to the heating or calcining step. Though the catalyst composites are difficult to analyze, there are indications that one of the active constituents of catalysts thus prepared corresponds to a phosphoric acid of a slightly greater degree of dehydration than pyrophosphoric acid. There are also some silico-phosphoric acid complexes of varying composition present in the composites, which may contribute to the desired catalytic and structural properties of the particles.

The heated products from heating element 9 pass through line 47 containing a valve 48 to a series of treating towers containing the granular catalyst. At this point the present process departs from the usual and what might be termed the apparently proper procedure in polymerizing gaseous olefins with solid phosphoric acid-containing catalysts in that instead of contacting the rich gas with a "weak" catalyst containing less than the usual 60% by weight of phosphoric anhydride (present principally in combination in pyrophosphoric acid) or a partly spent catalyst which has a similarly low activity, it is contacted with a "strong" or 60% catalyst at a relatively low temperature. So-called "rich" gases such as those obtained as the overhead from cracking plant stabilizers normally contain a high percentage of the more readily polymerizable olefins such as iso and normal butenes.

I have discovered that when the primary catalyst contact is weaker than the succeeding contacts as would be the case in what might be termed "countercurrent" operation there are greater difficulties encountered in the carbonizing of the catalyst. The reason for this is that the deposition of carbonaceous materials on the catalyst granules in a series of treating towers is due to what may be termed "over-polymerizing" of primary polymers until a molecular weight is reached corresponding to a gummy or resinous or even a carbonized material. Thus when a gas mixture containing olefins is contacted with a relatively weak catalyst and subsequently with catalyst beds of increasing activity there is a tendency for the essentially formed polymers of iso-butylene, the mixed polymers of iso and normal butylenes and to some extent the primary lower molecular weight polymers of normal butylenes to become over-polymerized particularly when the heat developed in the reactions is not removed in some way as the temperature increases.

In the operation of the present invention in contrast to the former briefly recounted difficulties, the strong catalyst is contacted with the strongest gas at a relatively low temperature of the order of 275–300° F. and in the succeeding towers of a series the catalyst is made progressively weaker so that the tendency to overpolymerization of primary polymers is diminished and at the same time the tendency to temperature rise due to the polymerization reactions is kept down. As a rule operations are preferably conducted so that temperatures of approximately 450° F. are not exceeded in the final tower of the series.

In actual commercial practice of the invention, therefore, the primary tower in a series will contain fresh catalyst and the succeeding towers will contain partially spent catalysts of lesser activity and finally catalyst which is low in activity just above the point which is chosen for its reactivation.

The drawing shows four similar towers in series and these may be rotated in any way so that the objects of the invention are accomplished. The primarily heated gas mixture passes through line 49 containing valve 50 to a primary treater 51; the partially polymerized gas mixture leaves the bottom of the tower by way of line 55 with valve 56 closed and follows line 57 containing a valve 58 to enter line 49' containing closed valve 50' leading to a second treater 51'. From this point on, the flow is similar, the further polymerized materials passing through line 55' with valve 56' closed and thence through line 57' containing valve 58' into line 49" containing closed valve 50" into a third treater 51". From this treater line 55" with valve 56" closed leads to a fourth treater 51''' by way of line 57" containing a valve 58" and a line 49''' containing a closed valve 50'''.

The products from the final treater may be passed through line 55''' containing valve 56''' into a hot water separator 60' from which water may be drawn through line 63 containing valve 64 and the polymers passed through line 65 containing valve 66 through a cooler 67 and thence by way of line 68, line 70, and valve 71 to a stabilizing column 72 which has a line 73 containing valve 74 for the release of low vapor pressure dissolved gases which in the proper operation of the process will consist principally of propane and butanes. The operation of this stabilizer will be more or less conventional and needs no special description since it is no particular feature of the present invention. The stabilized polymers follow line 75 containing valve 76 to a receiver 77 provided with a bottom draw line 80 containing valve 81 for any remaining aqueous layer, a vent line 78 containing a valve 79 for the release of any fixed gases and a line 82 containing a valve 83 for the removal of the product of the process. A valve 69 is provided in line 68 for by-passing stabilizer 72 in the event that stabilization is not necessary or desired.

It will be seen from the arrangement of the lines connecting the four towers in series that the treater 51''' may be made the first of the series and that the partially polymerized gas mixture may be returned to treater 51 as the second of the series by way of return line 59 containing valve 60. This condition will obtain when the catalytic material and the final treater 51''' has become spent and then reactivated to its original activity or replaced by fresh catalyst. Under these conditions valve 56 could be open and valve 58 closed and the polymer products passed to water separator 60' by way of line 61 containing valve 62. Similarly the polymer products could be passed directly from treater 51' through valve 56' with valve 58' closed and from treater 51" through valve 56" with valve 58" closed.

The following example is given as illustrative of the improved results which are experienced when the present process is utilized in connection with the polymerization of the higher olefins present in a stabilizer overhead comprising principally hydrocarbons of three and four carbon atoms although it is not intended to unduly limit the proper scope of the invention thereby.

The three and four carbon atom hydrocarbon fraction was subjected to exhaustive water washing to remove basic compounds and to a light caustic soda wash to remove hydrogen sulfide and low boiling mercaptans. After this preliminary treatment it was admitted to contact with successive bodies of solid phosphoric acid catalysts of decreasing activity while increasing the temperature. Conditions were maintained in the plant by reactivation of spent catalyst and replacements were necessary so that the first tower of a series of four was always at the highest point of catalyst efficiency while the succeeding towers gradually decreased in potency. The gases were continuously admitted to the first tower at a temperature of 280° F., to the second tower at approximately 340–350° F., to the third tower at 360–370° F. and other final towers at some temperature below 400° F., the rise in temperature being occasioned by the exothermic reactions.

By the foregoing method of procedure it was found that the lives of the catalyst beds were greatly extended since the primary polymers from iso and normal butenes were not overpolymerized and a fresh bed could be operated approximately 60% longer than if a constant temperature was maintained through beds of increased polymerizing activity.

I claim as my invention:

1. A process for polymerizing normally gaseous olefins to produce polymers therefrom utilizable as constituents of gasoline which comprises subjecting an olefin-containing gas mixture to contact with a solid phosphoric acid-containing catalyst in successive stages characterized by increasing temperatures and decreasing catalytic activity in said stages.

2. A process for polymerizing normally gaseous olefins to produce polymers therefrom utilizable as constituents of gasoline which comprises subjecting an olefin-containing gas mixture to contact with a solid granular catalyst consisting essentially of a precalcined mixture of a phosphoric acid and a siliceous adsorbent in successive stages characterized by increasing temperatures and decreasing catalytic activity in said stages.

3. A process for polymerizing normally gaseous olefins to produce polymers therefrom utilizable as constituents of gasoline which comprises subjecting an olefin-containing gas mixture to contact with a solid phosphoric acid-containing catalyst in successive stages characterized by increasing temperatures within the aproximate range of 275–450° F. and by decreasing catalytic activity in said stages.

4. A process for polymerizing normally gaseous olefins to produce polymers therefrom utilizable as constituents of gasoline which comprises subjecting an olefin-containing gas mixture to contact with a solid granular catalyst consisting essentially of a precalcined mixture of a phosphoric acid and a siliceous adsorbent in successive stages characterized by increasing temperatures within the approximate range of 275–450° F. and by decreasing catalytic activity in said stages.

5. A process for polymerizing normally gaseous olefins to produce polymers therefrom utilizable as constituents of gasoline which comprises subjecting an olefine-containing gas mixture to contact with a solid phosphoric acid-containing catalyst in successive stages characterized by increasing temperatures within the aproximate range of 275–450° F. under pressures within the range of 100–500#/sq. in. and by decreasing catalytic activity in said stages.

6. A process for polymerizing normally gaseous olefins to produce polymers therefrom utilizable as constituents of gasoline which comprises subjecting an olefin-containing gas mixture to contact with a solid granular catalyst consisting essentially of a precalcined mixture of a phosphoric acid and a siliceous adsorbent in successive stages characterized by increasing temperatures within the approximate range of 275–450° F. under pressures within the range of 100–500#/sq. in. and by decreasing catalytic activity in said stages.

7. A process for polymerizing the olefins contained in cracked hydrocarbon gas mixtures to produce polymers therefrom utilizable as constituents of gasoline which comprises subjecting said gas mixture to contact with a solid phosphoric acid-containing catalyst in successive stages characterized by increasing temperatures within the approximate range of 275–400° F. under pressures within the range of 100–500#/sq. in. and by decreasing catalytic activity in said stages.

8. A process for polymerizing the olefins contained in cracked hydrocarbon gas mixtures to produce polymers therefrom utilizable as constituents of gasoline which comprises subjecting said gas mixture to contact with a solid granular catalyst consisting essentially of a precalcined mixture of a phosphoric acid and a siliceous adsorbent in successive stages characterized by increasing temperatures within the approximate range of 275–450° F. under pressures within the range of 100–500#/sq. in. and by decreasing catalytic activity in said stages.

9. A proces for polymerizing the olefins contained in cracked hydrocarbon gas mixtures to produce polymers therefrom utilizable as constituents of gasoline which comprises subjecting said gas mixture to contact with a solid phosphoric acid-containing catalyst in successive stages characterized by increasing temperatures within the approximate range of 275–400° F. under pressures within the range of 100–500#/sq. in. and by decreasing catalytic activity in said stages, and fractionating the products to remove substantially all normally gaseous constituents and produce a fraction boiling within the range of gasoline.

10. A process for polymerizing the olefins contained in cracked hydrocarbon gas mixtures to produce polymers therefrom utilizable as constituents of gasoline which comprises subjecting said gas mixtures to contact with a solid granular catalyst consisting essentially of a precalcined mixture of a phosphoric acid and a siliceous adsorbent in successive stages characterized by increasing temperatures within the approximate range of 275–450° F. under pressures within the range of 100–500#/sq. in. and by decreasing catalytic activity in said stages, and fractionating the products to remove substantially all normally gaseous constituents and produce a fraction boiling within the range of gasoline.

11. In the polymerization of normally gaseous olefins in the presence of solid phosphoric acid catalyst, the improvement which comprises passing the olefinic gas through successive polymerizing stages in which the catalytic activity of the solid phosphoric acid catalyst masses progressively decreases from stage to stage in the direction of flow of the gas through the stages.

12. The improvement as defined in claim 11 further characterized in that the polymerizing temperature in the successive stages progressively increases from stage to stage in the direction of flow of the gas through the stages.

13. A process for polymerizing normally gaseous olefins which comprises passing the olefinic gas under polymerizing conditions through successive masses of polymerizing catalyst whose catalytic activity progressively decreases in the direction of flow of the gas therethrough.

14. A process for polymerizing normally gaseous olefins which comprises passing the olefinic gas at progressively increasing polymerizing temperature through successive masses of polymerizing catalyst whose catalytic activity progressively decreases in the direction of flow of the gas therethrough.

EDWIN F. NELSON.